Oct. 11, 1938.     H. A. SCHACK     2,132,651
BEDPAN
Filed Nov. 19, 1936
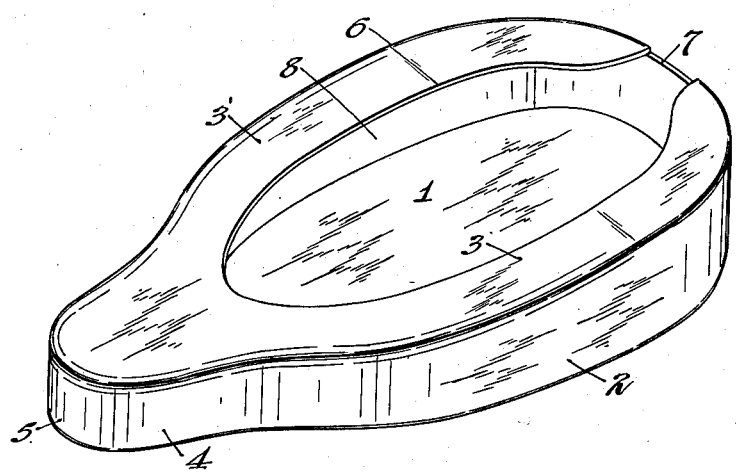
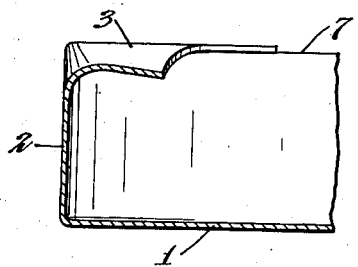
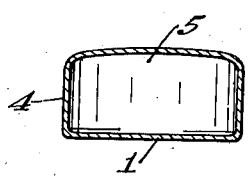
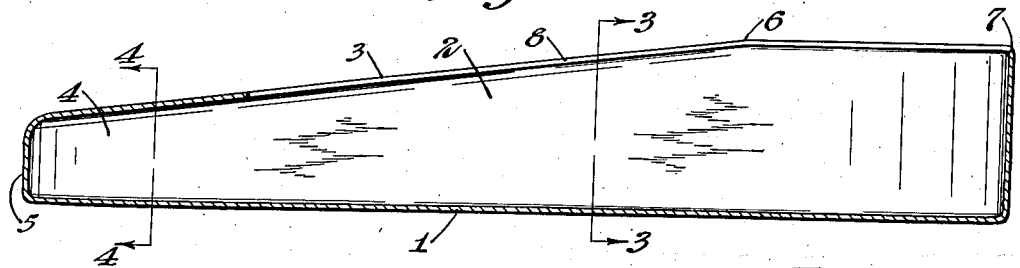
Inventor
Helene A. Schack
By
Attorney Patented Oct. 11, 1938

2,132,651

UNITED STATES PATENT OFFICE 2,132,651

BEDPAN

Helene A. Schack, St. Paul, Minn.

Application November 19, 1936, Serial No. 111,602

1 Claim. (Cl. 4—112)

The present invention relates to a urinal utensil adapted for use by a female patient lying flat on her back.

An object of the invention is the ease with which the utensil may be slipped under the patient, without raising the patient, and be thoroughly braced in position in use, and afford the maximum amount of comfort for the patient.

These and other features of the invention will be more particularly set forth in the following description and the accompanying drawing, wherein:

Figure 1 is a view in perspective of the invention.

Figure 2 is a central longitudinal, vertical, sectional view of the invention.

Figure 3 is a sectional view on line 3—3 of Figure 2; and

Figure 4 is a sectional view on line 4—4 of Figure 2.

Referring to the drawing in detail, 1 represents the bottom of the utensil, which is flat to closely engage the surface of a bed, 2 the upwardly extending side wall of the utensil, and 3 the top wall.

The connecting walls of the utensil, as shown particularly in Figure 1, form at their front end a relatively deep portion of the utensil, with the lines of the outer surface of the front of the utensil curved. From this curved front portion the side walls 2 extend rearward in substantially straight, parallel lines, and are then inwardly curved toward the rear end of the utensil to form a narrowed and relatively shallow, centrally projecting portion 4, terminating in a rounded end 5.

The top wall 3 terminates at the front end of the utensil in spaced ends to constitute an opening 7 through which the contents of the utensil may be easily discharged, said top wall 3 being formed with a central inlet opening 8 which terminates at its rear end back of the narrowed rear end 4 of the utensil. The top wall 3 is preferably joined to the side wall, as shown in Figures 3 and 4, on a curved line and the said top wall between its outer edge and the central inlet opening is preferably slightly curved to bring about more comfort to the patient in use.

From the point 6 to the front end of the utensil the top wall is preferably flattened, as shown particularly in Figure 2, the top wall inclining downwardly from the point 6 to the rear flattened and narrowed end of the utensil, for the purpose hereinafter set forth.

When the utensil is placed in position under a patient, the narrowed and relatively thin rearwardly projecting end 4 may be easily slipped between the buttocks toward the base of the spinal column, with the top wall of that narrowed and relatively thin portion extending from the base of the spinal column and the urethral discharge opening. The thighs will rest against the curved side walls and top wall of the utensil, and, the front end of the utensil being relatively high, will form an enlarged receptacle end, and by being relatively flattened to a point a short distance back of the front end of the utensil and from that point being inclined downwardly, will constitute a stop portion helping to limit the rearward movement of the utensil.

I have found by experience as a nurse the necessity of securing a urinal receptacle for female patients that may be small, and that may be positioned under the patient when in a prone position without discomfort to the patient. The different constructions of ordinary bed and douche pans are not designed for this purpose, or so constructed as to accomplish the necessary objects. Efforts have been made to design pans for this purpose. In some cases they have been so widened and shaped at the rear end of the utensil as to necessarily bring about pressing, causing discomfort, and otherwise subject to various objections in connection with not being easily slipped under the patient without moving or lifting the patient. Through my features of invention the utensil can be made quite small, the average measurements being a depth of comparatively one inch at the rear neck portion and about two inches at the front portion, with the neck portion approximately two and a half inches from the top opening 8 to its extreme rear end, and a length of utensil of approximately eleven inches and a width of six inches. The side top walls against which the thighs rest are about one inch in width.

The construction of the rearwardly extending narrowed portion and the deepened front portion with its relatively flat top is important in accomplishing the purposes of the present invention, and I have found by practical experience as a nurse that an ease of insertion of the utensil and comfort to the patient are achieved that have not heretofore been possible.

I claim:

A urinal utensil of the class described, comprising bottom, side, end, and top walls, the top wall being essentially flat from side wall to side wall, said top wall at its front end being essentially parallel with the bottom wall and merging to a downwardly inclined portion toward the rear of the utensil, said top wall being formed with a central receiving opening terminating materially short of the rear end of the utensil and at the front end of the utensil terminating in a central slotted opening in the front end of the top wall within the confines of the end wall, and the side walls of the utensil abruptly merging inwardly adjacent the rear portion of the opening and terminating in a relatively narrow neck portion constituting the rear end of the utensil.

HELENE A. SCHACK.